(12) United States Patent
Marath et al.

(10) Patent No.: US 6,874,808 B2
(45) Date of Patent: Apr. 5, 2005

(54) APPARATUS AND METHOD FOR MAINTAINING A UNIFORM GAP BETWEEN AN AIRBAG MODULE AND ITS SURROUNDING STRUCTURE

(75) Inventors: Paul Marath, Vandalia, OH (US); Wayne W. Morgan, Miamisburg, OH (US)

(73) Assignee: Delphi Technologies, Inc., Troy, MI (US)

( * ) Notice: Subject to any disclaimer, the term of this patent is extended or adjusted under 35 U.S.C. 154(b) by 28 days.

(21) Appl. No.: 10/373,161

(22) Filed: Feb. 24, 2003

(65) Prior Publication Data

US 2004/0056453 A1 Mar. 25, 2004

Related U.S. Application Data

(60) Provisional application No. 60/412,332, filed on Sep. 20, 2002.

(51) Int. Cl.[7] ............................................... B60R 21/16
(52) U.S. Cl. .................................................... 280/728.2
(58) Field of Search .............................. 280/728.2, 731, 280/728.3, 728.1

(56) References Cited

U.S. PATENT DOCUMENTS

| | | | | |
|---|---|---|---|---|
| 5,333,897 A | * | 8/1994 | Landis et al. | 280/728.2 |
| 5,380,037 A | * | 1/1995 | Worrell et al. | 280/728.2 |
| 5,630,611 A | * | 5/1997 | Goss et al. | 280/728.2 |
| 5,639,113 A | * | 6/1997 | Goss et al. | 280/728.2 |
| 6,196,573 B1 | * | 3/2001 | Worrell et al. | 280/728.2 |
| 6,325,408 B1 | * | 12/2001 | Ford | 280/728.2 |
| 6,454,300 B1 | | 9/2002 | Dunkle et al. | |
| 6,554,312 B2 | * | 4/2003 | Sakane et al. | 280/728.2 |
| 6,712,383 B2 | * | 3/2004 | Asic et al. | 280/728.2 |

OTHER PUBLICATIONS

European Search Report for Application No. EP 03 07 7629.

* cited by examiner

*Primary Examiner*—Faye M. Fleming
(74) *Attorney, Agent, or Firm*—Scott A. McBain

(57) ABSTRACT

An apparatus and method for maintaining a uniform gap between the periphery of an airbag module and its surrounding structure, comprising: at least one bushing having a protrusion depending outwardly from a surface of the bushing; and at least one insulator having a first bushing opening being configured to allow a portion the bushing to be slidably received therein, the bushing opening being configured to define a limit of travel of the portion of the bushings within the bushing opening.

34 Claims, 8 Drawing Sheets

APPARATUS AND METHOD FOR MAINTAINING A UNIFORM GAP BETWEEN AN AIRBAG MODULE AND ITS SURROUNDING STRUCTURE

CROSS REFERENCE TO RELATED APPLICATIONS

This application claims the benefit of U.S. Provisional Application 60/412,332 filed Sep. 20, 2002, the contents of which are incorporated herein by reference thereto.

TECHNICAL FIELD

The present disclosure relates to airbag modules and more particularly the present disclosure relates to an apparatus and method for maintaining a uniform gap between an airbag module and its surrounding structure.

BACKGROUND

This application is related to U.S. Pat. Nos. 5,380,037; 6,092,832; 6,196,573; and 6,237,944, the contents of which are also incorporated herein by reference thereto.

Vehicles are supplied with driver's side airbag modules; generally the driver's side airbag module is located in the center of the steering wheel. This is also the same location where a horn-activating switch has traditionally been mounted.

Various mounting mechanisms have been used for securing the inflatable restraint module to a support structure in a vehicle, such as a steering wheel or dashboard. In one known mounting mechanism, mounting bolts are provided passing from a rear of the support structure and threadably engaging nuts mounted on the inflatable restraint module. In another known mounting mechanism for a vehicle steering wheel, sleeve members mounted to the inflatable restraint module and surrounding the mounting bolts may be forced into contact with a plate forming the supporting structure on a hub portion of the steering wheel to complete a circuit for actuating a horn.

Eventually, the horn-activating switch was adapted for mounting on the underside of the airbag module wherein the module was mounted in a "free floating" arrangement to allow the user to activate the horn by applying an activation pressure to the module and move the driver's side airbag module into a horn activation position. Such horn-activating switches react to a user-applied force to the cover in an effort to sound the horn. For example, and in such a system the entire airbag module moves as force is applied to actuate the horn.

Most original equipment manufacturers (OEMs) style their driver's side airbag modules and steering wheels by using a contoured gap between the two parts. This gap primarily allows the driver's side airbag module to move freely relative to the Class A surfaces of the wheel (free movement is required for a floating horn system). However, the OEMs also contour these gaps so that they contribute to the overall style and appearance of the driver's side airbag module and steering wheel assembly.

Once attached the module is capable of movement through the application of a user-applied force wherein a horn circuit is completed in accordance with known technologies. The module is biased in a non-contact or open circuit position by a biasing spring. A current apparatus for a snap-in floating horn system uses the combination of three components at each point of attachment. The three components are a locking pin extending from the driver's side airbag module, a locking spring attached to the wheel, and a plastic insulator also attached to the wheel. These three components work in conjunction and can be arranged to create a two, three, or four-point driver's side airbag module attachment to the wheel. During module attachment, the locking pin goes through a slot in the insulator, displaces a locking spring attached to the insulator or the steering wheel, and locks into the wheel after the locking spring moves back to its original position thereby engaging a groove in the locking pin.

The slot size within the insulator determines the free movement or amount of play the pin will have. If the slot is too small, the locking pin will be restricted, and the floating horn will bind. Therefore, the slot has to be sufficiently larger than the size of the locking pin to allow for free movement of the driver's side airbag module. However, the large slot size also allows the pin and the driver's side airbag module attached thereto to move from side-to-side (x-direction or cross car direction) and up-down (y-direction or orthogonal with respect to axis of steering column or orthogonal with respect to the horn activation direction). This movement may create non-uniform gaps between the driver's side airbag module and steering wheel and/or spokes.

SUMMARY

This disclosure relates to a floating horn system in which the driver's side airbag module is a moving part of the system. A floating horn system naturally requires a loose fit at the point the driver's side airbag module attaches to the wheel. The assembly of the present disclosure allows the driver's side airbag module to move freely when it is pushed to activate the horn while maintaining a continuous or uniform gap between the driver's side airbag module and its surrounding structure.

An apparatus for maintaining a uniform gap between the periphery of an airbag module and its surrounding structure, comprising: a pair of bushings each having a protrusion depending outwardly from a surface of the bushing; and a first insulator having a first bushing opening being configured to allow a portion of one of the pair of bushings to be slidably received therein, the first bushing opening being configured to define a limit of travel of the portion of the one of the pair of bushings within the first bushing opening; and a second insulator having a second bushing opening being configured to allow a portion of the other one of the pair of bushings to be slidably received therein, the second bushing opening being configured to define a limit of travel of the portion of the other one of the pair of bushings within the second bushing opening; wherein the second bushing opening has a greater dimension in a first direction than a second direction for defining the limit of travel and the dimension in the second direction is similar to the dimension of the protrusion.

A method for maintaining a uniform gap between the periphery of an airbag module and the surrounding structure housing the airbag module, comprising: securing a bushing to a locking pin of the airbag module wherein a portion of the bushing is generally circular in shape; slidably securing the locking pin to a portion of the surrounding structure wherein the bushing is free to move within an insulator disposed about an opening in the portion of the surrounding structure in a range defined by a first position and a second position, the first position corresponding to a portion of the airbag module making contact with another structure and the second position corresponding to a protrusion of the bushing making contact with an opening of the insulator; wherein the opening of the insulator is configured to allow the bushing to move therein until either the protrusion of the bushing makes contact with the opening of the insulator or the portion of the airbag module makes contact with another structure.

DETAILED DESCRIPTION

This disclosure relates to an airbag module connection assembly for use with "flat-form, snap-in" driver's side airbag module/floating horns. It can be used for a two-point, three-point, or a four-point snap-in driver's side airbag modules. In addition, the airbag module connection assembly of the present disclosure is contemplated for use with other types of snap-in driver side airbag modules having floating horns (e.g., non-flat-form, snap-in pins). Referring now to the Figures, the present disclosure provides a method and apparatus for maintaining a uniform gap between an airbag module and its surrounding structure. The uniform gap is maintained through the use of an airbag module connection assembly 10.

Airbag module connection assembly 10 provides a means for allowing an airbag module to be connected to a steering wheel armature 12 or equivalent structure as well as allowing movement of the airbag module from a first position to a second position in order to complete a horn activation circuit. The airbag module connection assembly also prevents unwanted or undesired movement in directions, which would create a non-uniform gap between an edge of the airbag module and its surrounding structure, which may comprise portions of the steering wheel that do not include the airbag module but are adjacent to its periphery.

As discussed above the airbag module connection assemblies are configured for use with "flat form, snap-in" locking pins of a driver's side airbag module. The airbag module connection assemblies convert a portion of the flat form locking pin into a circular, oval, round or elliptical or equivalent structure configured for being slidably received within an opening of an insulator of the airbag module connection assemblies.

Figure 1:
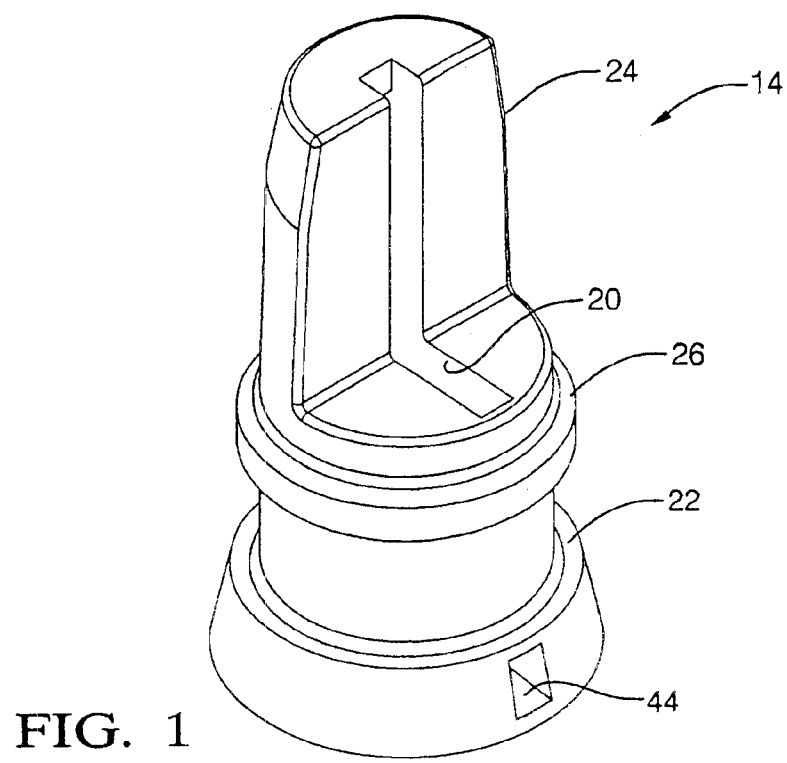
FIG. 1 is a perspective view of a bushing for use with the present disclosure.

In an exemplary embodiment at least one or a plurality of airbag module connection assemblies 10 are used to maintain the module in the desired position as it is moved between the contact (horn activation) and non-contact positions. Each airbag module connection assembly 10 comprises a bushing 14. Each bushing 14 is configured for attachment to a locking pin 16 of a base plate 18 of the driver's side airbag module. An exemplary bushing is illustrated in FIG. 1. The bushing has a slot or opening 20 configured for allowing a portion of the locking pin to pass through.

The bushing also has an upper portion 22 and a lower portion 24. The upper portion is generally circular in configuration and is configured to allow movement of the bushing within the airbag module connection assembly as will be discussed herein. Of course, other equivalent structures or configurations such as oval, elliptical, spherical and equivalents thereof are configured for the upper portion of the bushing. Disposed on a portion of the upper portion is a ring of material or protrusion 26. Ring of material 26 depends outwardly from a surface of upper portion 22 and as will be discussed herein provides a means for maintaining a uniform gap between the periphery of the airbag module and its surrounding structure. Lower portion 24 and slot 20 are configured to allow a portion of the locking pin to pass therethrough.

Figure 2:
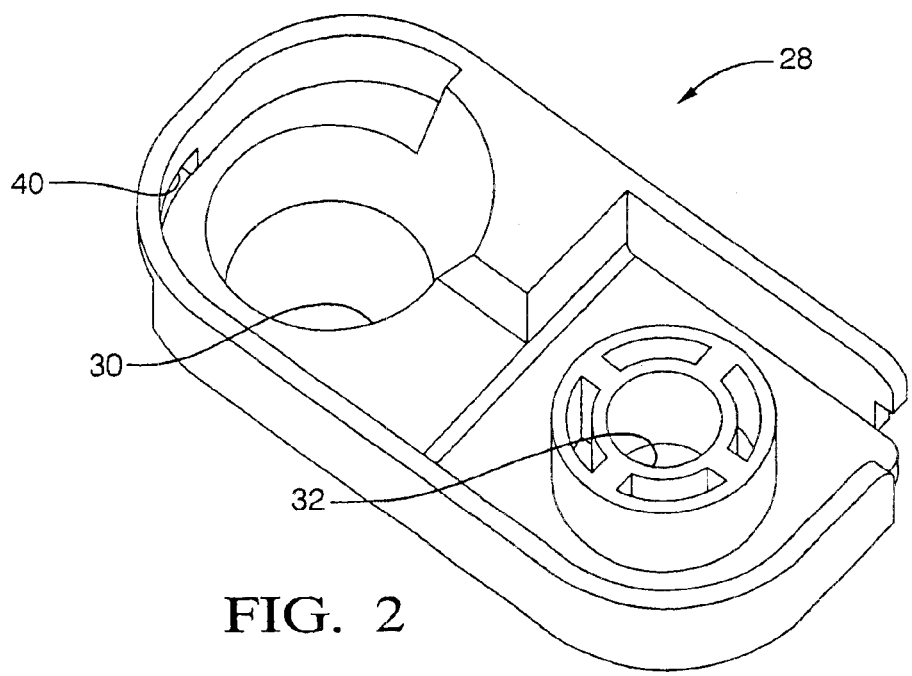
FIG. 2 is a perspective view of an insulator for use with the present disclosure.
Figure 4:
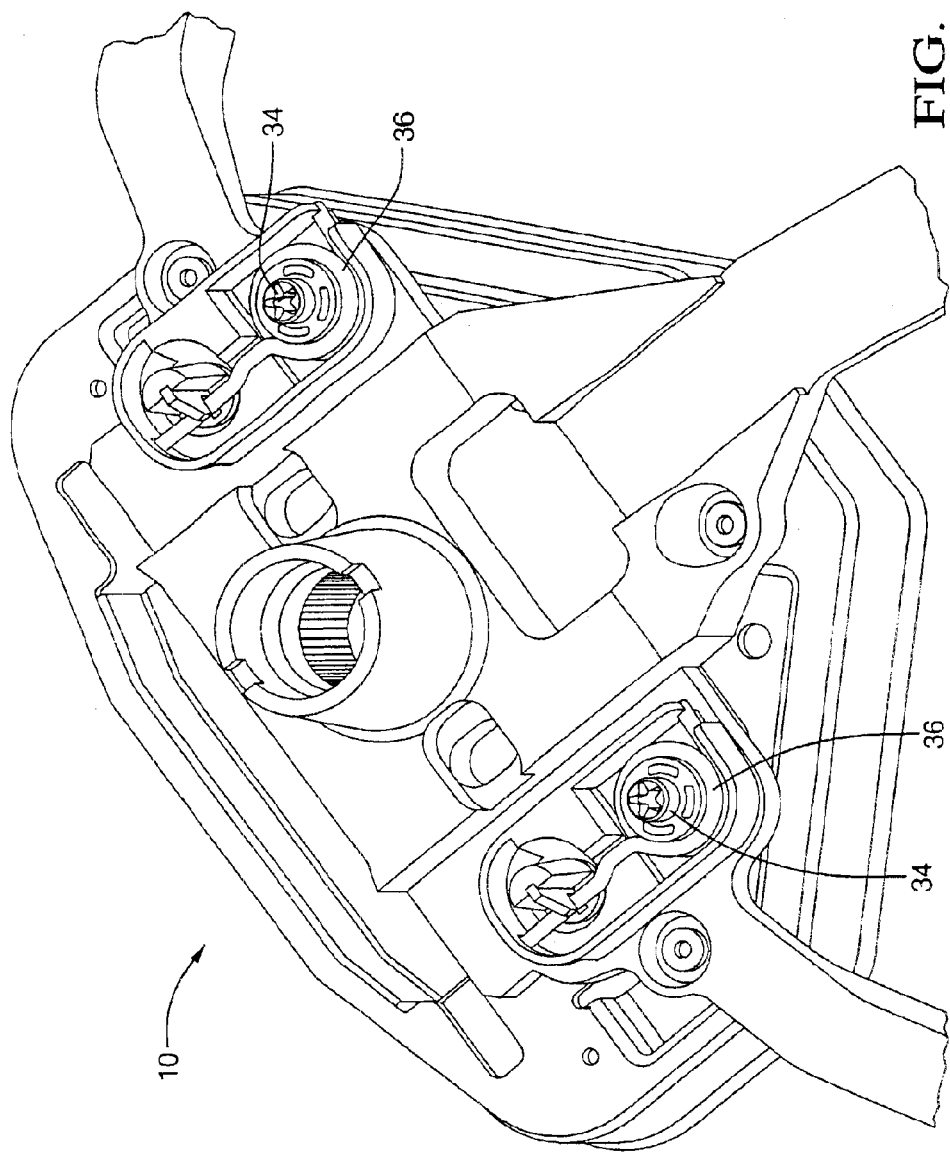
FIG. 4 is a perspective view of a driver's side airbag module baseplate secured to a steering wheel armature via two-point connection.

Referring now to FIGS. 2 and 4, an insulator 28 of airbag module connection assembly 10 is illustrated. Insulator 28 has a bushing opening 30 and a fastener opening 32. Bushing opening 30 is configured to slidably receive bushing 14 therein. In addition, insulator 28 also has a securement opening 32 configured for receiving a fastening means 34 therein. Fastening means 34 provides a means for securing insulator 28 to the steering wheel armature. Fastening means 34 can be integral with the steering wheel armature or the insulator or is separately secured to both.

A locking spring 36 is positioned to engage a slot or opening 38 of the portion of the locking pin, which passes through a slot or opening 20 of bushing 14. The locking springs are positioned and configured to be biased into a locking configuration wherein the airbag module is prevented from being completely removed from the steering wheel armature unless the locking spring is urged into a non-locking position wherein the locking spring is no longer engaged in opening 38 of the locking spring, thereby allowing removal of the airbag module from the steering wheel armature. In addition, the insulator is also configured to have an opening or slot 40 in a sidewall to allow for biasing of the locking spring into the non-engagement position.

Accordingly, the locking pins are configured to engage a portion of the locking spring, which provides a means for securing the airbag module to the steering wheel armature.

Figure 7A:
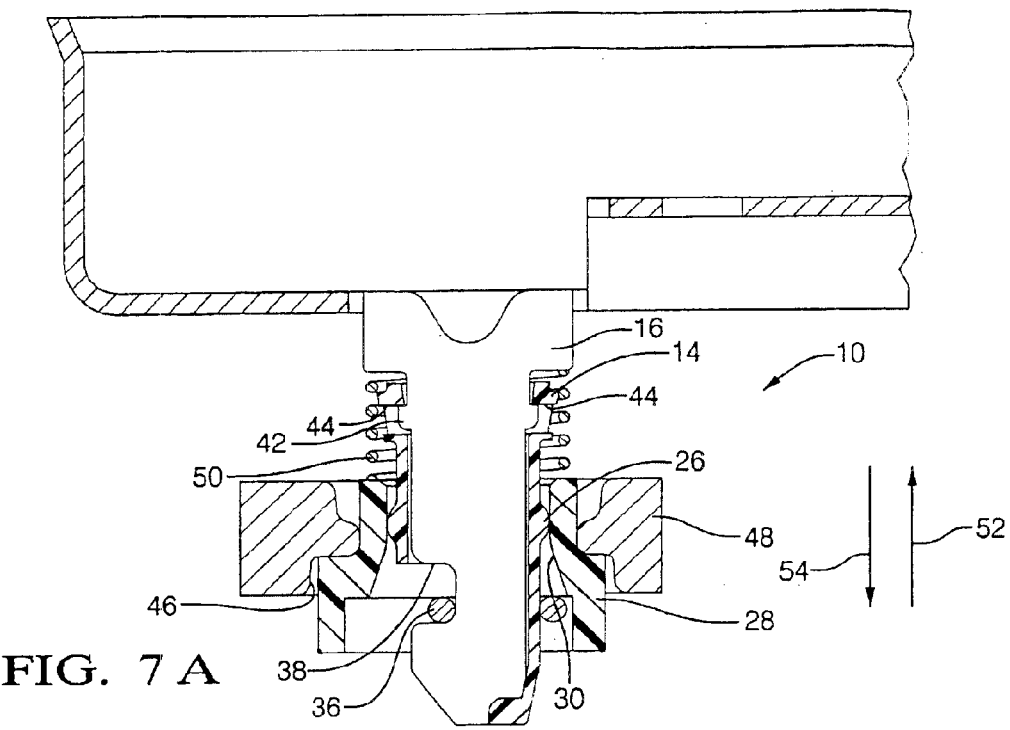
FIGS. 7A and 7B are cross sectional views of a bushing attached to a locking pin.
Figure 7B:
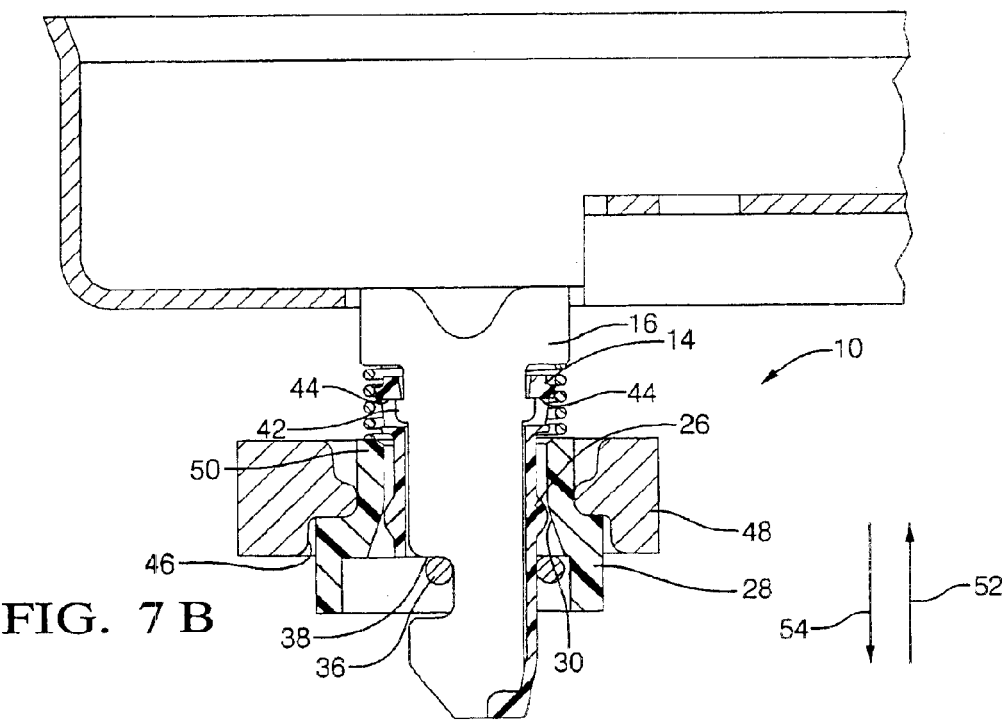

Referring now to FIGS. 7A and 7B, the bushings are attached to the flat form pins by sliding the bushing onto the locking pin until a protrusion 42 of the locking pin is engaged within an engagement opening 44 of the bushing. Each bushing is cylindrical in shape and slotted in the middle. The slot allows the bushing to slide onto and snap-fit to the flat-form locking pin. Essentially, the bushing transforms the flat-sided locking pins into round ones.

The insulators are located and secured within an opening 46 of a steering wheel armature 48. The insulators are secured to the steering wheel armature by an interference fit, mechanical securement or other equivalent means for securing the insulator to the steering wheel armature. A biasing spring 50 is disposed between the insulator and a portion of the locking pin or bushing to provide a biasing force in the direction of arrow 52.

Opening 30 of the insulator is chamfered or angled to provide a smaller sized opening at a top portion (closer to the driver's side airbag module) and gradually increases to a larger sized opening (further away from the driver's side airbag module). In the position illustrated in FIG. 7A, the ring of material or protrusion of the bushing makes contact with an inner surface of opening 30. This position is maintained by the biasing force of spring 50 and corresponds to a non-horn activating position. In addition, the ring of material also provides a means for maintaining a uniform gap between the periphery of the driver's side airbag module and its surrounding structure as will be discussed herein.

As an individual applies a force to a portion of the driver's side airbag module, the biasing force of spring 50 is overcome and the module travels in the direction of arrow 54 until contacts or a switch of a horn activation circuit (now shown) or closed and the horn activates (FIG. 7B). In this position there is a gap between the sidewalls of opening 30 and protrusion or ring of material 26. Thus, the driver's side airbag module is capable of movement in the directions between the sidewall of opening 30 and protrusion or ring of material 26. Upon release of the user applied force spring 50 causes the module to return to the position illustrated in FIG. 7 wherein there is no horn activation. During this movement (e.g., from a non-horn activating position to a horn activation position) the ring of material slides from a contact position (with the wall of opening 30) to a non-contact position as the opening enlarges in the direction of arrow 54. This allows for ease of sliding of the bushing within the housing thereby preventing binding or sticking of the bushing within the opening. In addition, opening 38 of the locking pin is also configured to allow for movement of the locking spring therein as locking pin 16 moves in the direction of arrow 54.

Accordingly, and as user activates the horn by applying a force to the airbag module the module is free to move in the direction of arrow 54 and returns to its original unbiased configuration which corresponds to a uniform gap between the periphery of the airbag module and its surrounding structure as ring of material 26 and the chamfered wall of insulator 28 guide the module back to its original location every time though the application of the biasing force of spring 50 in the direction of arrow 52.

Figure 3:
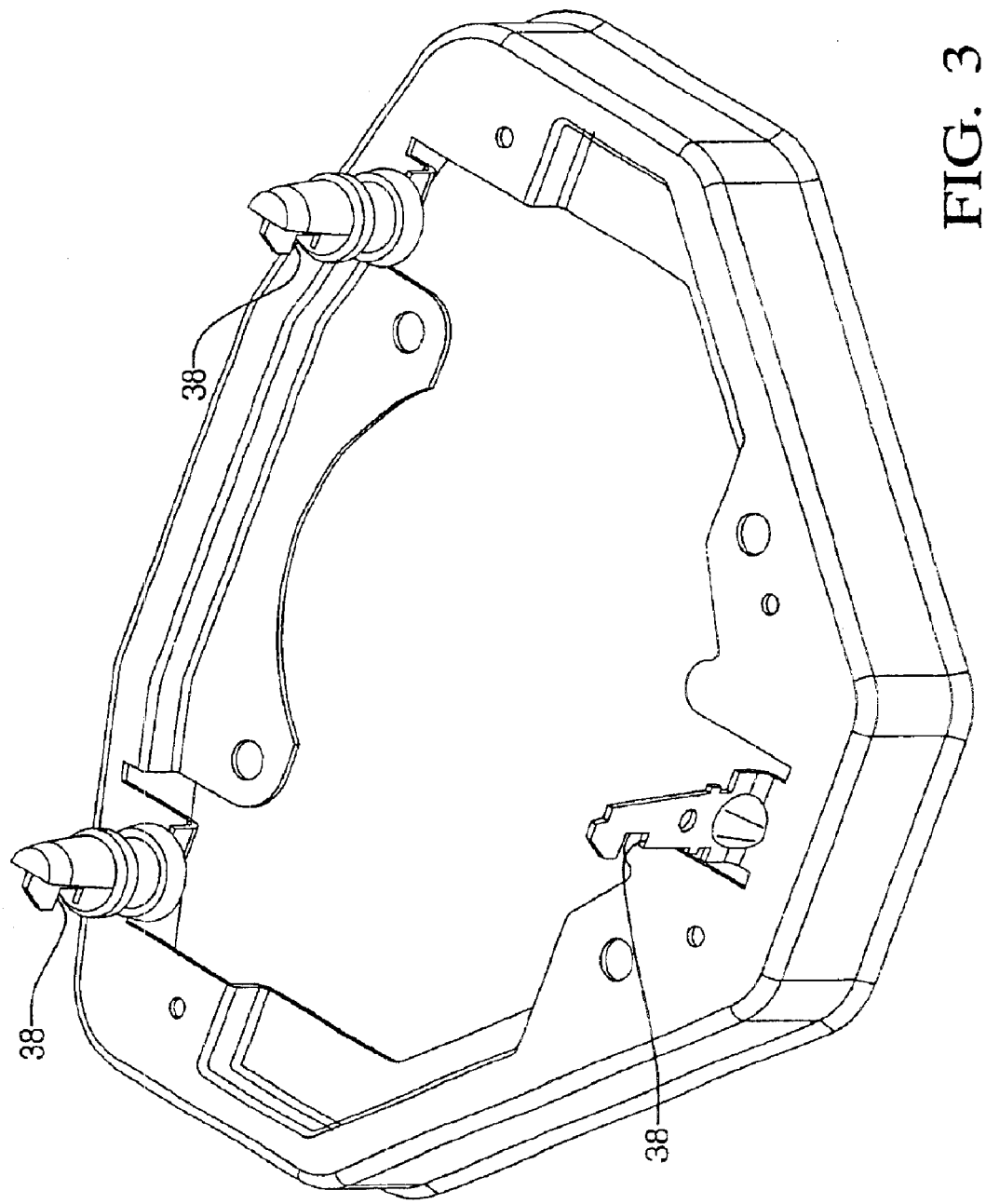
FIG. 3 is a perspective view of a driver's side airbag module baseplate with bushings positioned on the locking pins.
Figure 5:
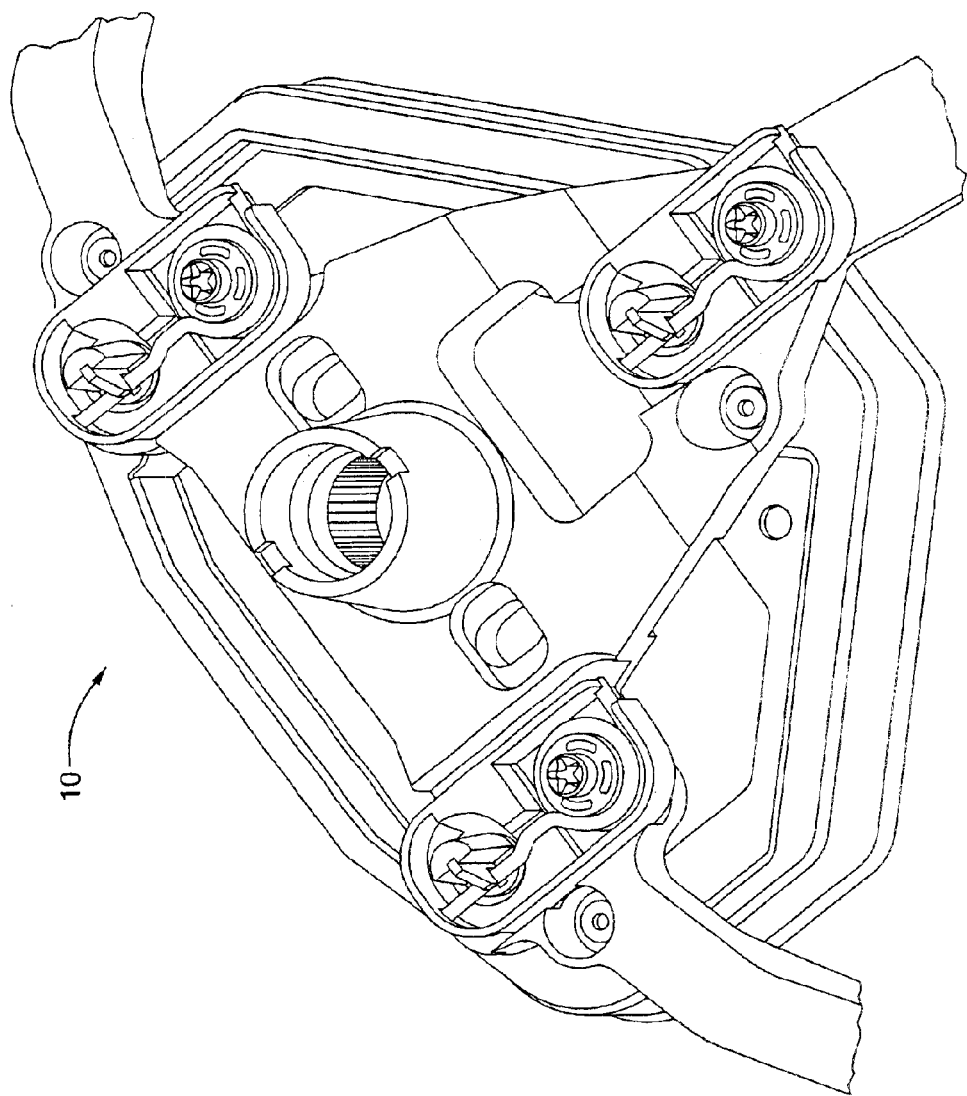
FIG. 5 is a perspective view of a driver's side airbag module baseplate secured to a steering wheel armature via three-point connection.
Figure 6:
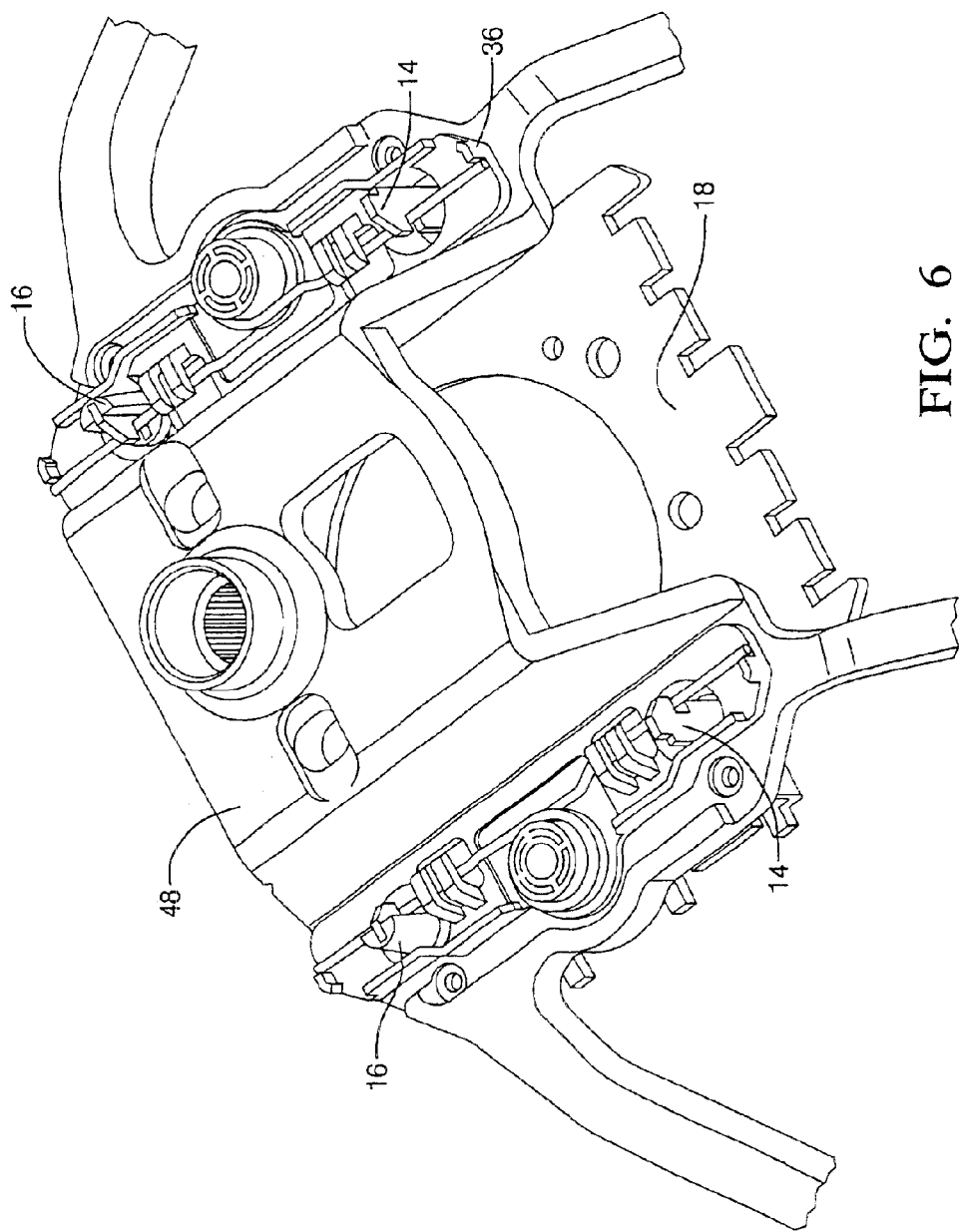
FIG. 6 is a perspective view of a driver's side airbag module baseplate secured to a steering wheel armature via four-point connection.

It is noted that the airbag module connection assemblies are contemplated for use with a three pin airbag module (FIG. 3) or a two-point attachment (FIG. 4) or with the upper two pins in the cases of a three (FIG. 5) or four-point attachment (FIG. 6).

Figure 10:
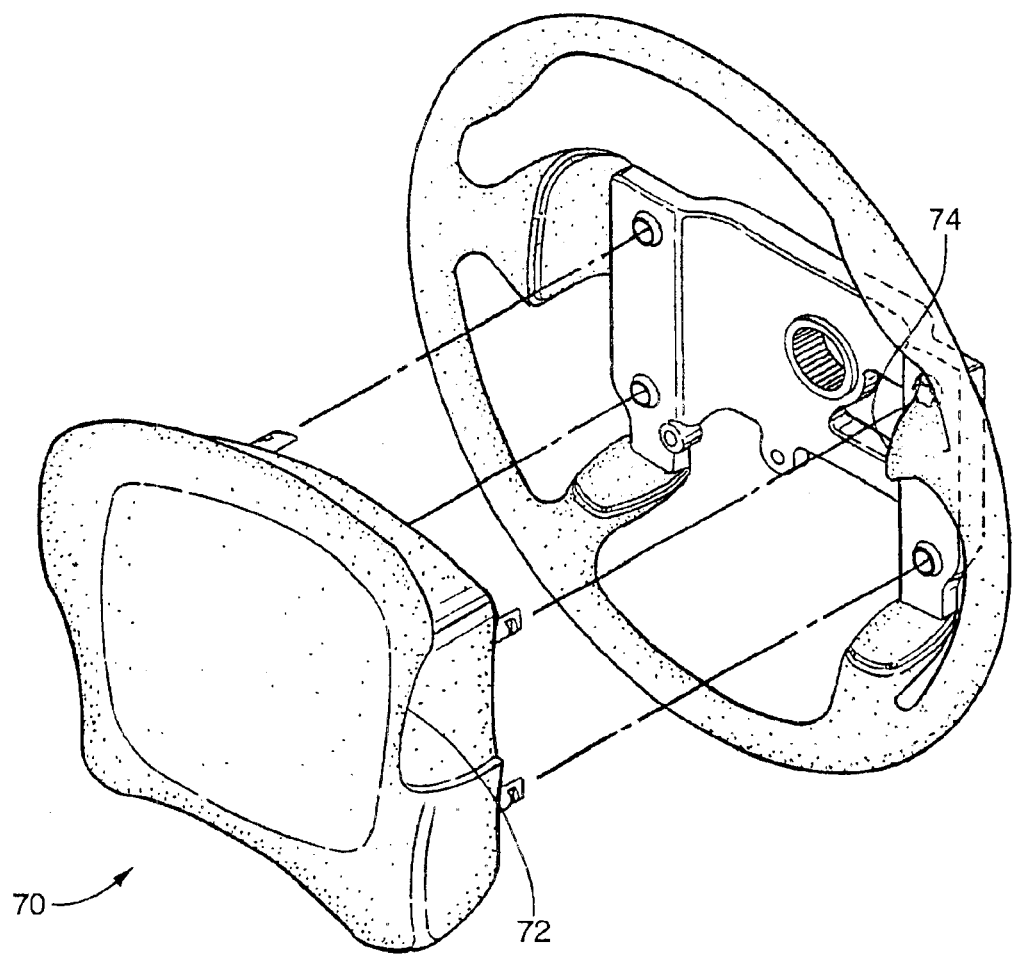
FIG. 10 is a perspective view of a driver's side airbag module and a steering wheel into which it is inserted.

The ring of material or protrusion on the bushing enables the airbag module connection assembly to reduce or eliminate gap variations between the airbag module and its surrounding structure. For example, and referring now to FIG. 10 an airbag module 70 is illustrated having a periphery 72 wherein it is desirable to maintain the periphery in a uniform distance from its surrounding structure 74. Since the bushing slides up and down within the bushing opening of the insulator and the bushing opening is smaller in diameter at the top than at the bottom, the airbag module is precisely positioned in its free state (no horn activation), wherein the bushing stays in the smaller diameter zone of the insulator. In an exemplary embodiment the diameter of the ring on the bushing is dimensioned slightly smaller than the diameter of this zone of the insulator opening. Hence, in this position, the insulator tightly controls the bushings' movement within the hole. This position corresponds to the position of the driver's side airbag module where uniform gaps are desired.

Figure 9:
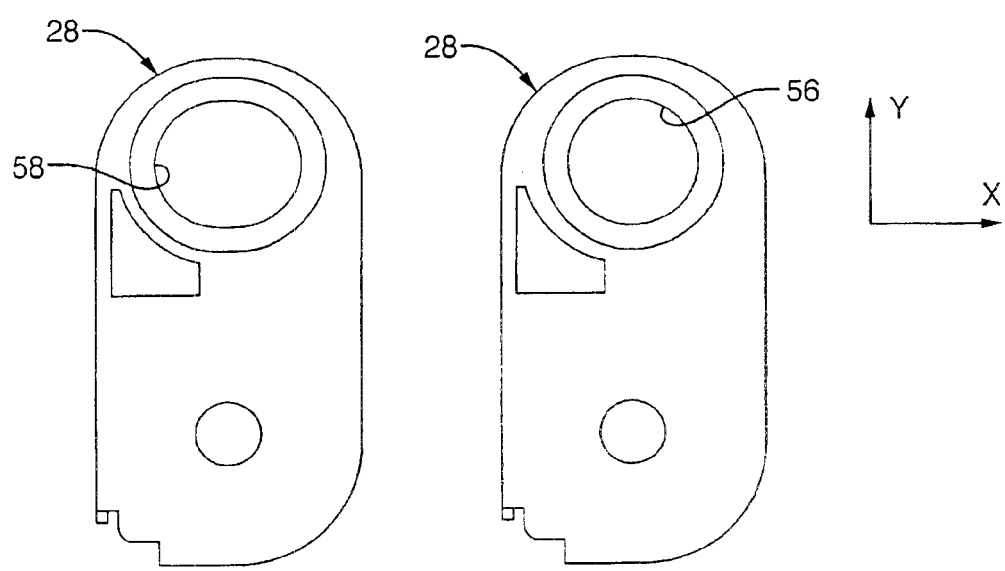
FIG. 9 is a plan view of a pair of insulators (right and left) for use with the bushings of the present disclosure.

Referring now to FIGS. 1, 3–7 and 9 and in order to reduce the variation of the module with it's surrounding structure and during the movement up and down during horn activation and deactivation, a pair of bushings and insulators is employed. The bushings, attached to the upper left and right locking pins (when view from the front of the airbag module, e.g., from a driver's perspective), are exactly the same. The insulators, on the other hand, are different. One insulator has a round, "net fit" bushing opening 56 (FIG. 9) through which one bushing goes into. The second insulator has a "slotted" bushing opening 58 in which the other bushing goes into (FIG. 9).

This combination reduces the variation of the module in the x and y directions illustrated in FIG. 9. For example, the round hole insulator has a dimension corresponding to the free state position that is very close to the dimension of the ring of material disposed on the bushing. Thus, the round hold insulator will reduce variations in the x as well as y directions. On the other hand the "slotted" hole opening in the left hand insulator will prevent movement in the y direction while being larger in the x direction. Of course, the left and right hand insulators may be interchanged as long as one opening is round and the other is slotted.

Lastly, when the bushing moves into the larger diameter zone of the insulator hole, it can move more freely in all directions. Therefore, when the driver pushes the driver's side airbag module to blow the horn, it moves freely.

The final result of this combination of bushings and insulators is a steering wheel and driver's side airbag module system that maintains greater uniformity in gaps at its interfaces. In one embodiment the bushings and insulators are made from polyoxymethylene (Acetyl plastic) or materials having equivalent characteristics.

Figure 8:
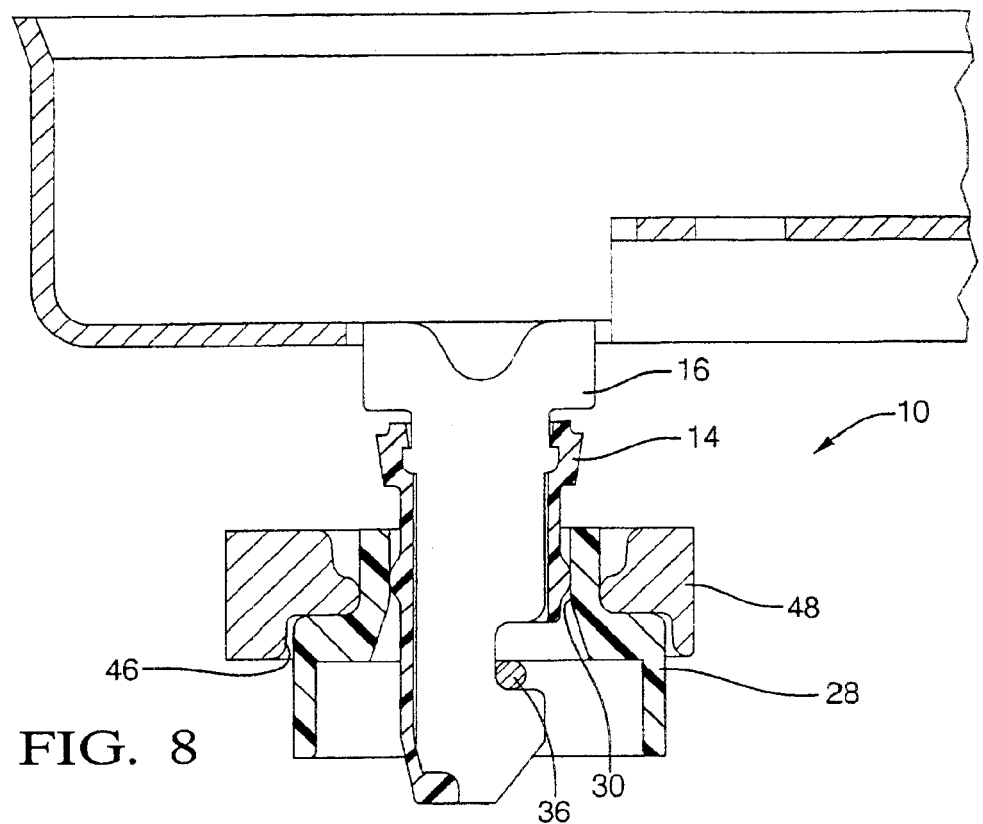
FIG. 8 is a cross sectional view of a bushing molded to a locking pin.

Regarding the manufacturing methods to produce the bushings, there are at least two. The first one involves injection molding the bushings as separate parts and then attaching them to the flat-form pins of the driver's side airbag module. For the second, the bushing is insert molded directly to the flat-form pins (FIG. 8).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An apparatus for maintaining a uniform gap between the periphery of an airbag module and its surrounding structure, comprising:

a bushing having a protrusion depending outwardly from a surface of said bushing; and an insulator having a bushing opening being configured to allow a portion of said bushing to be slidably received therein, said bushing opening being configured to define a limit of travel of said portion of said bushing within said bushing opening, wherein said limit of travel is defined by said protrusion engaging said bushing opening, wherein said bushing opening has an upper inner dimension corresponding to an exterior dimension of said protrusion and expands to a lower inner dimension which is larger than said exterior dimension of said protrusion.

2. The apparatus as in claim 1, wherein said limit of travel corresponds to the uniform gap between the periphery of the airbag module and its surrounding structure when said bushing is secured to the airbag module.

3. The apparatus as in claim 1, wherein said limit of travel corresponds to the uniform gap between the periphery of the airbag module and its surrounding structure when said bushing is secured to the airbag module.

4. The apparatus as in claim 3, wherein said protrusion is a ring of material.

5. The apparatus as in claim 4, wherein said bushing is configured to snap-fit onto a locking pin of the airbag module.

6. The apparatus as in claim 4, wherein said bushing is configured to have an opening configured for allowing a portion of a locking pin of the airbag module to pass through.

7. The apparatus as in claim 6, wherein said opening is configured to allow a planar locking pin therethrough.

8. An apparatus for maintaining a uniform gap between the periphery of an airbag module and its surrounding structure, comprising:
a bushing having a protrusion depending outwardly from a surface of said bushing; and
an insulator having a bushing opening being configured to allow a portion of said bushing to be slidably received therein, said bushing opening being configured to define a limit of travel of said portion of said bushing within said bushing opening, wherein said limit of travel is defined by said protrusion engaging said bushing opening, wherein said protrusion is a ring of material.

9. An apparatus for maintaining a uniform gap between the periphery of an airbag module and its surrounding structure, comprising:
a bushing having a protrusion depending outwardly from a surface of said bushing; and
an insulator having a bushing opening being configured to allow a portion of said bushing to be slidably received therein, said bushing opening being configured to define a limit of travel of said portion of said bushing within said bushing opening, wherein said limit of travel is defined by said protrusion engaging said bushing opening, wherein said bushing opening is defined by chamfered walls.

10. An apparatus for maintaining a uniform gap between the periphery of an airbag module and its surrounding structure, comprising:
a pair of bushings each having a protrusion depending outwardly from a surface of said bushing; and
a first insulator having a first bushing opening being configured to allow a portion of one of said pair of bushings to be slidably received therein, said first bushing opening being configured to define a limit of travel of said portion of said one of said pair of bushings within said first bushing opening; and
a second insulator having a second bushing opening being configured to allow a portion of the other one of said pair of bushings to be slidably received therein, said second bushing opening being configured to define a limit of travel of said portion of the other one of said pair of bushings within said second bushing opening;
wherein said second bushing opening has a greater dimension in a first direction than a second direction for defining said limit of travel and the dimension of said second direction is similar to the dimension of said protrusion.

11. The apparatus as in claim 10, wherein said first insulator is located on a steering wheel armature and said second insulator is located on said steering wheel armature laterally disposed from said first insulator; wherein said second insulator allows movement of one of said pair of bushings in said first direction.

12. The apparatus as in claim 10, wherein said first insulator and said second insulator each are configured to allow movement in directions other than the sliding of the pair of bushings in a direction away from said limit of travel.

13. The apparatus as in claim 10, wherein said first opening is circular and said second opening is oval or elongated in shape.

14. The apparatus as in claim 10, wherein each bushing is spring biased towards said limit of travel.

15. The apparatus as in claim 10, wherein each bushing further comprises an upper portion and a lower portion, said protrusion being disposed on said upper portion and said lower portion depending away from said upper portion, said upper portion being closer to the airbag module when said pair of bushings are secured to a pair of locking pins of the airbag module.

16. The apparatus as in claim 15, wherein each bushing is configured to have an opening configured for allowing a portion of the locking pin of the airbag module to pass through.

17. The apparatus as in claim 16, wherein said opening is configured to allow a planar locking pin therethrough.

18. The apparatus as in claim 17, wherein said opening is configured to allow the portion of the locking pin to be disposed below said upper portion of said bushing and adjacent to said lower portion of said bushing when said bushing is secured to the locking pin of the airbag module.

19. The apparatus as in claim 15, wherein said bushing is plastic and is molded onto the locking pin of the airbag module.

20. A method for maintaining a uniform gap between the periphery of an airbag module and the surrounding structure housing the airbag module, comprising:
securing a bushing to a locking pin of the airbag module wherein a portion of the bushing is generally circular in shape;
slidably securing said locking pin to a portion of the surrounding structure wherein said bushing is free to move within an insulator disposed about an opening in said portion of the surrounding structure in a range defined by a first position and a second position, said first position corresponding to a portion of the airbag module making contact with another structure and said second position corresponding to a protrusion of said bushing making contact with an opening of said insulator; wherein said opening of said insulator is configured to allow said bushing to move therein until either said protrusion of said bushing makes contact with said opening of said insulator or said portion of the airbag module makes contact with another structure, wherein said opening of said insulator has an upper inner dimension corresponding to an exterior dimension of said protrusion and expands to a lower inner dimension which is larger than said exterior dimension of said protrusion.

21. The apparatus as in claim 8, wherein said bushing and said insulator are plastic.

22. An airbag module connection assembly for converting the periphery of a flat locking pin of the airbag module into a uniform periphery, the connection assembly comprising:

a bushing having a protrusion depending outwardly from a surface of said bushing, said bushing being configured to receive and engage the locking pin of the air bag module, wherein said locking pin has a planar configuration and said bushing provides a non-planar exterior configuration; and an insulator having a bushing opening being configured to allow a portion of said bushing to be slidably received therein, said bushing opening being configured to define a limit of travel of said portion of said bushing within said bushing opening, wherein said bushing opening has an upper inner dimension corresponding to an exterior dimension of said protrusion and expands to a lower inner dimension which is larger than said exterior dimension of said protrusion.

23. The airbag module connection assembly as in claim 22, wherein said bushing is free to move within said bushing opening when said protrusion is moved from said upper inner dimension towards said lower inner dimension.

24. The airbag module connection assembly as in claim 22, wherein said protrusion of said bushing is biased towards said upper inner dimension by a spring.

25. The airbag module connection assembly as in claim 22, wherein said protrusion defines a circular periphery.

26. The airbag module connection assembly as in claim 22, wherein said surface of said bushing defines a circular periphery.

27. The airbag module connection assembly as in claim 22, wherein the air bag module is a driver's side airbag module.

28. The airbag module connection assembly as in claim 27, wherein said limit of travel corresponds to a uniform gap between a periphery of the driver's side airbag module and a surrounding structure when said bushing is secured to said locking pin.

29. The airbag module connection assembly as in claim 22, wherein said limit of travel is defined by said protrusion engaging said bushing opening at either end of said lower inner dimension or said upper inner dimension.

30. The airbag module connection assembly as in claim 29, wherein said protrusion is a ring of material.

31. The airbag module connection assembly as in claim 22, wherein said bushing is configured to snap-fit onto said locking pin.

32. The airbag module connection assembly as in claim 22, wherein said bushing is configured to snap-fit onto said locking pin by engaging a protrusion of said locking pin.

33. The airbag module connection assembly as in claim 22, wherein said bushing is configured to have an opening configured for allowing a portion of said locking pin to pass through.

34. An airbag module connection assembly for converting the periphery of at least two flat locking pins of the airbag module into a uniform periphery, the connection assembly comprising:

a pair of bushings each having a protrusion depending outwardly from a surface of said pair of bushings, one of said pair of bushings being configured to receive and engage one of the at least two locking pins of the air bag module and the other one of said pair of bushings being configured to receive engage the other one of the at least two locking pins, wherein the least two locking pins each have a planar configuration and said pair of bushings provides a non-planar exterior configuration; and a pair of insulators each having a bushing opening being configured to allow a portion of one of said pair of bushings to be slidably received therein, said bushing openings being configured to define a limit of travel of said portion within said bushing opening, wherein said bushing opening has an upper inner dimension corresponding to an exterior dimension of said protrusion and expands to a lower inner dimension which is larger than said exterior dimension of said protrusion, wherein one of said pair of bushing openings is configured to be larger in a first direction than the other one of said pair of bushing openings.

* * * * *